United States Patent [19]

Pielartzik et al.

[11] Patent Number: 5,084,547
[45] Date of Patent: Jan. 28, 1992

[54] THERMOTROPIC, FULLY AROMATIC POLYCONDENSATES, A PROCESS FOR THEIR PREPARATION AND THEIR USE FOR THE PRODUCTION OF MOULDED ARTICLES, FIBRES, FILAMENTS, SHEET PRODUCTS AND FILMS

[75] Inventors: Harald Pielartzik; Hermann Brinkmeyer; Rolf-Volker Meyer, all of Krefeld; Bernd Willenberg, Bergisch Gladbach, all of Fed. Rep. of Germany

[73] Assignee: Bayer Aktiengesellschaft, Leverkusen, Fed. Rep. of Germany

[21] Appl. No.: 580,470

[22] Filed: Sep. 11, 1990

Related U.S. Application Data

[63] Continuation of Ser. No. 380,294, Jul. 17, 1989, abandoned.

[30] Foreign Application Priority Data

Jul. 27, 1988 [DE] Fed. Rep. of Germany ....... 3825410

[51] Int. Cl.$^5$ ............................................. C08G 75/00
[52] U.S. Cl. .................................... 528/171; 528/173; 528/176; 528/193; 528/194; 528/272; 528/294; 528/295; 528/302; 528/308.6; 525/437; 525/450; 525/534; 525/535
[58] Field of Search ............... 528/171, 173, 176, 193, 528/194, 272, 294, 295, 302, 308.6; 525/437, 450, 534, 535

[56] References Cited

U.S. PATENT DOCUMENTS 4,599,395 7/1986 Dicke et al. ...................... 528/173

Primary Examiner—John Kight, III
Assistant Examiner—Sam A. Acquah
Attorney, Agent, or Firm—Connolly and Hutz

[57] ABSTRACT

The thermotropic, fully aromatic polycondensates according to the invention, which contain compounds capable of complex formation, are distinguished by improved resistance to hydrolysis and may be used for the production of moulded articles, fibres, filaments, sheet products and films.

7 Claims, No Drawings

THERMOTROPIC, FULLY AROMATIC POLYCONDENSATES, A PROCESS FOR THEIR PREPARATION AND THEIR USE FOR THE PRODUCTION OF MOULDED ARTICLES, FIBRES, FILAMENTS, SHEET PRODUCTS AND FILMS

This is a continuation of application Ser. No. 380,294 filed July 17, 1989, abandoned.

This invention relates to high molecular weight, thermotropic, fully aromatic polycondensates with improved resistance to hydrolysis, a process for their preparation and their use for the production of moulded articles, sheet products, films, filaments and fibres.

Thermotropic or mesomorphic, fully aromatic polycondensates such as polyesters and polyester carbonates used for the production of moulded articles, filaments, fibres and sheet products are described, for example, in DE-OS 33 25 704 and in DE-OS 34 15 530. In the said Offenlegungsschriften, the terms "mesomorphic" and "thermotropic" are explained and the conventional method of investigating the liquid crystalline state of polymer melts is described.

Thermotropic, fully aromatic polyester carbonates and polyesters prepared by the known processes (see e.g. EP 0 132 631, DE 3 517 948 and EP 0 170 935) have good mechanical properties and advantageous flow properties but the resistance of these polycondensates to hydrolysis is insufficient for certain applications. Thus it is noted that on exposure to water, blisters rapidly form on the surface of parts of aromatic, thermotropic polyester carbonates and polyesters and the strength and toughness of the aromatic thermotropic polycondensates is thereby considerably reduced, the severity of the damage depending upon the temperature.

The present invention relates to thermotropic, fully aromatic polycondensates based on a) optionally substituted aromatic hydroxy carboxylic acids,
b) diphenols,
c) aromatic dicarboxylic acids and
d) optionally carbonic acid, characterised in that they contain compounds capable of complex formation.

The compounds used for complex formation should be of the type which improve the resistance to hydrolysis of the thermotropic, fully aromatic polycondensates without imparing their mechanical properties.

Compounds capable of complex formation or chelate formation are known in the literature and are described, for example, in Bell, Principles and Applications of Metal Chelate Ions, London. University Press, 1977, and in Rümpps Chemie-Lexikon, Volume 1, A-Cl, 8th edition, published by Fränkische Verlagshandlung, Stuttgart, 1979.

Complex forming or chelate forming compounds which improve the resistance to hydrolysis of thermotropic, fully aromatic polycondensates may easily be selected from the known complex forming or chelate forming compounds by suitable preliminary tests.

Suitable complex formers include, for example, compounds containing didentate or multidentate ligands, such as ethylene diaminotetra acetic acid, glycerol, mannitol, thio-glycolic acid, salicylic aldoxime and/or aromatic sulphonic acids containing at least two functional groups capable of complex formation in the ortho or peri position. Hydrogen fluoride is another example of a suitable complex former.

Aromatic sulphonic acids capable of complex formation are particularly preferred. The following are examples: hydroxyaryl sulphonic acids such as phenol-2-sulphonic acid, 1-naphthol-2-sulphonic acid, 1-naphthol-8-sulphonic acid and 2-naphthol-1-sulphonic acid; dihydroxyaryl sulphonic acids such as hydroquinone sulphonic acid, 2,7-dihydroxynaphthalene-3-sulphonic acid, 3,6-dihydroxy-2-sulphonic acid and 2,3-dihydroxynaphthalene-6-sulphonic acid; hydroxyaryl disulphonic acids such as phenol-2,4-disulphonic acid, 1-naphthol-2,5-disulphonic acid, 2-naphthol-3,7-disulphonic acid and 1-naphthol-4,8-disulphonic acid; dihydroxyaryl disulphonic acids such as hydroquinone-2,5-disulphonic acid, 2,7-dihydroxynaphthalene-3,6-disulphonic acid, 1,8-dihydroxynaphthalene-3,6-disulphonic acid and 2,6-dihydroxynaphthalene-3,6-disulphonic acid; more highly substituted hydroxyaryl sulphonic acids such as 1-naphthol-2,4,8-trisulphonic acid, 2-naphthol-3,6,8-trisulphonic acid, 1-naphthol-3,6,8-trisulphonic acid, 1-naphthol-3,8-disulphonic acid and 1-naphthol-4,8-disulphonic acid; and aromatic carboxylic sulphonic acids, such as 2-sulphobenzoic acid, 5-sulphosalicylic acid, 4-hydroxy-3-sulphobenzoic acid, 1-hydroxy-4,7-disulpho-2-naphthalene carboxylic acid, 3-hydroxy-5-sulpho-2-naphthalene carboxylic acid, 3-hydroxy-7-sulpho-2-napthalene carboxylic acid and 3,5-dihydroxy-7-sulpho-2-naphthalene carboxylic acid.

The following are particularly preferred aromatic sulphonic acids capable of complex formation: phenol-2-sulphonic acid, 1-naphthol-2-sulphonic acid, 2-naphthol-1-sulphonic acid, 1-naphthol-8-sulphonic acid, hydroquinone sulphonic acid, hydroquinone-2,5-disulphonic acid, 1,8-dihydroxynaphthalene-3,6-disulphonic acid, 2,7-dihydroxy-naphthalene-3,6-disulphonic acid, 2-sulphobenzoic acid, 5-sulphosalicylic acid, 4-hydroxy-3-sulphobenzoic acid and/or 1-hydroxy-4,7-disulpho-2-naphthalene carboxylic acid.

The aromatic sulphonic acids may contain additional substituents, such as alkyl, alkoxy, aryl, aryloxy or halogen groups. They may also carry condensed benzene groups. The aromatic sulphonic acids may be used either as free acids or in the form of their salts or as mixtures of acids and salts.

Either partial or complete salts may be used, depending on the number of sulphonic acid groups per molecule and mixed salts are, of course, also suitable. Among aromatic sulphonic acid salts, it is suitable to use salts of main group and subgroup metals, preferably ammonium, alkali metal and/or alkaline earth metal salts, especially the sodium and/or potassium salts.

The thermotropic, fully aromatic polycondensates according to the invention generally contain the compounds capable of complex formation in quantities of about 1 to 1000 ppm, preferably from 10 to 500 ppm, based on the sum of the quantity of starting components a) to d). The quantity of complex forming compounds in the thermotropic, fully aromatic polycondensates depends to a large extent on the purity of the starting components a) to d) put into the process and on the nature of the catalysts used for the preparation of the thermotropic, fully aromatic polycondensates. The most suitable proportion of complex forming compounds in any particular thermotropic fully aromatic polycondensates may easily be determined by preliminary tests, in which the resistance to hydrolysis of the polycondensate is an essential criterion.

The substituted or unsubstituted aromatic hydroxy carboxylic acids (component a)), diphenols (component b)) and aromatic dicarboxylic acids (component c)) suitable for the thermotropic, fully aromatic polycondensates according to the invention are known and are described, for example, in EP 132 637, 131 846 and 134 959 and DE 3 325 705, 3 325 703, 2 704 315 and 2 025 971.

p-Hydroxybenzoic acid and/or 6-hydroxy-naphthalene-2-carboxylic acid are preferred compounds used as component a); hydroquinone, 4,4'-dihydroxydiphenyl and/or 2,6-dihydroxynaphthalene are preferred components b) and terephthalic acid and/or isophthalic acid are preferred components c).

Carbonic acid may be used in known manner as diaryl carbonates, such as diphenyl carbonate.

The invention further relates to a process for the preparation of thermotropic, fully aromatic polycondensates by the esterification of optionally substituted p-hydroxybenzoic acids and aromatic dicarboxylic acids with diaryl carbonates and transesterification of the resulting aryl esters with diphenols and optionally other diaryl carbonates, optionally in the presence of chain terminating agents, followed by polycondensation at temperatures of about 150° to 350° C. in the presence of catalysts and optionally at reduced pressure.

According to another process variation, the compounds capable of complex formation may be incorporated in the thermotropic, fully aromatic polycondensates prepared by conventional methods by subsequently compounding the complex forming compounds with the fully aromatic polycondensates in known manner.

In the preferred variation, however, the complex forming compounds are already added at the stage of preparation of the thermotropic, fully aromatic polycondensates, i.e. at any stage of the reaction (transesterification reaction or polycondensation reaction). The addition of complex forming compounds before the onset of the reaction of starting components is particularly preferred.

The preparation of the thermotropic, fully aromatic polycondensates according to the invention by the solvent free transesterification process is known and is described in some detail, for example, in EP 0 132 637, DE 2 704 315 and DE 2 025 971.

Suitable catalysts for accelerating the esterification and transesterification reactions and the polycondensation reactions are also known; see EP 0 132 637.

Particularly suitable compounds for the preparation of the thermotropic, fully aromatic polycondensates according to the invention include alkyl tin carboxylates such as tributyl tin acetate and/or di-n-butyl tin dilaurate, alkali metal carboxylates such as the potassium salt of benzoic acid, in particular the potassium salt of parahydroxybenzoic acid, and imidazole. When such catalysts are used, the effect of increased resistance to hydrolysis is particularly marked when complex forming compounds are used, in particular complex forming aromatic sulphonic acids.

The thermotropic polycondensates prepared by the process according to the invention generally have an inherent viscosity of at least 1.0 dl/g (determined on a solution of 5 mg of polymer/ml of pentafluorophenol at 60° C.).

The molecular weights of the polycondensates may be increased by subjecting them, preferably as granulates, to a solid phase condensation under an inert gas atmosphere or in a vacuum at temperatures of about 150° to 300° C.

It is sometimes desired to regulate the molecular weight of the polycondensates. This may be achieved by using monofunctional compounds which terminate the polycondensation reaction. Monofunctional compounds of this type are known and are described, for example, in U.S. Pat. Nos. 4,269,964 and 4,677,184.

Since the thermotropic, fully aromatic polycondensates according to the invention have relatively low fusion viscosity, they may advantageously be worked up from the melt for the production of injection moulded parts, fibres, filaments, sheet products and films. The addition of compounds capable of complex formation considerably increases the resistance to hydrolysis of the thermotropic, fully aromatic polycondensates, and thereby has an advantageous effect on the properties of the products produced from the polycondensates.

EXAMPLES

The test for notched impact strength ($a_k$) was carried out according to DIN 53 453 (ISO/R 179) at 23° C., in each case on 10 test samples.

GENERAL METHOD OF PREPARATION 305.0 g of p-hydroxybenzoic acid, 112.2 g of hydroquinone, 31.6 g of 4,4'-dihydroxydiphenyl, 28.2 g of terephthalic acid, 779.3 g of diphenyl carbonate and the transesterification catalyst were weighed into a reaction vessel equipped with stirrer, column and distillation bridge and heated until $CO_2$ began to evolve. The reaction temperature was raised to 220° C. in the course of 2 hours and kept constant until the evolution of $CO_2$ ceased. The reaction mixture was then heated to 250° C. and the pressure in the reactor was lowered stepwise to 30 mbar in the course of 1.5 hours. After one hour, the rate of distillation had slowed down to such an extent that the reaction temperature could be raised to 275° C. and later to 300° C. After the elimination of phenol had been substantially completed, the pressure in the reaction vessel was lowered to 0.2 mbar. The reaction was completed after one hour under these condensation conditions. The product obtained was light in colour and had a marked fibrous structure. It was injection moulded at a mass temperature of T=330° C. and a mould temperature of 70° C.

To test the resistance to hydrolysis, test samples measuring 80×10×4 mm were stored in water at 100° C. and the notched impact strength was determined in relation to the storage time.

The results obtained with different transesterification catalysts are summarized in Table 1.

The reduction in impact strength on storage in water depends on the transesterification catalyst used.

TABLE 1

Resistance to hydrolysis in dependence upon the Transesterification Catalyst

| Experiment | Nature of Catalyst | Concentration (%) of the catalyst based on the polycondensate | Notched Impact strength $a_k$ in dependence upon the hydrolysis time in water at 100° C. $a_k$ (KJ/$m^2$) | | | | Residual notched impact strength after 100 hours (%) |
|---|---|---|---|---|---|---|---|
| | | | 0 | 10 | 50 | 100 | |
| | | | | (t(h)) | | | |
| 1 | Sodium phenolate | 0.005 | 57 | 40 | 25 | 5 | 8.8 |
| 2 | Dibutyl tin dilaurate | 0.04 | 55 | 45 | 30 | 10 | 18.2 |
| 3 | Titaniumtetraisopropylate | 0.04 | 60 | 38 | 24 | 8 | 13.3 |
| 4 | K salt of p-hydroxybenzoic acid | 0.02 | 50 | 42 | 30 | 20 | 40.0 |
| 5 | Zinc acetate | 0.04 | 57 | 44 | 35 | 30 | 70.2 |
| 6 | Imidazole | 0.1 | 58 | 50 | 45 | 40 | 69.0 |
| 7 | — | — | 53 | 48 | 30 | 17 | 32.1 |

To test the effect of the complex formers in increasing the resistance to hydrolysis, the compounds mentioned below were
a) weighed in with the monomers at the outset,
b) added after about 75% of the phenol had been split off or
c) incorporated in the finished polymer by compounding.

Compounds:
Phenol-2-sulphonic acid,
1-naphthol-8-sulphonic acid,
2,3-dihydroxynaphthalene-6-sulphonic acid,
Hydroquinone sulphonic acid,
1-naphthol-4,8-disulphonic acid,
Hydroquinone disulphonic acid,
1,8-dihydroxynaphthalene-3,6-disulphonic acid,
2,7-dihydroxynaphthalene-3,6-disulphonic acid,
5-sulphosalicylic acid,
1-naphthol-4-sulphonic acid and
Phenol-3-sulphonic acid.

To test the resistance to hydrolysis, the granulates were stored in water at 100° C. (reflux) and the solution viscosities were determined after 250 hours.

The results are summarized in Table 2. Dibutyl tin dilaurate was used as catalyst.

TABLE 2

Solution viscosities in dependence upon the hydrolysis time ($\eta_{rel}$ determined in p-chlorophenol, T = 60° C.), (quantity: 0.5 g/105 ml of p-chlorophenol)

| Experiment Number | Complex former/addition according to (a) | Hydrolysis time (h) $\eta_{rel}$ | |
|---|---|---|---|
| | | (0) | (250) |
| Comparison | without complex former | 3.05 | 1.75 |
| 8 | 2-phenol sulphonic acid | 2.88 | 2.21 |
| 9 | 1-naphthol-8-sulphonic acid | 3.21 | 2.48 |
| 10 | 2,3-dihydroxynaphthalene-6-sulphonic acid | 2.94 | 2.24 |
| 11 | hydroquinone disulphonic acid | 2.87 | 2.45 |
| 12 | 1-naphthol-4,8-disulphonic acid | 2.97 | 2.45 |
| 13 | hydroquinone disulphonic acid | 2.87 | 2.29 |
| 14 | 1,8-dihydroxynaphthalene-3,6-disulphonic acid | 3.06 | 2.75 |
| 15 | 2,7-dihydroxynaphthalene-3,6-disulphonic acid | 3.10 | 2.41 |
| 16 | 5-sulphosalicylic acid | 3.03 | 2.73 |
| 17 | 3-sulphosalicylic acid | 2.89 | 2.54 |
| 18 | phenol-3-sulphonic acid (comparison) | 2.91 | 1.69 |
| 19 | 1-naphthol-4-sulphonic acid (comparison) | 3.11 | 1.83 |

Experiments 18 and 19 show that when there is no possibility of complex formation of the sulphonic acid, there is a marked deterioration in the resistance to hydrolysis of the polycondensates. The same applies when no complex forming compounds were added to the polymer.

TABLE 2a

Solution viscosity in dependence upon the hydrolysis time (methods of addition b + c)

| Experiment Number | Complex Former | Method of Addition | | Hydrolysis time (h) | |
|---|---|---|---|---|---|
| | | | | (0) | (250) |
| 20 | 2-phenol sulphonic acid | b | $\eta_{rel}$ | 3.14 | 2.20 |
| | | c | | 2.97 | 2.34 |
| 21 | hydroquinone disulphonic acid | b | | 3.04 | 2.45 |
| | | c | | 3.11 | 2.38 |
| 22 | 1,8-dihydroxy-naphthalene-3,6-disulphonic acid | b | | 2.87 | 2.61 |
| | | c | | 3.00 | 2.65 |
| 23 | 5-sulphosalicylic acid | b | | 2.95 | 2.61 |
| | | c | | 2.87 | 2.48 |
| 24 | phenol-3-sulphonic acid (comparison) | b | | 3.11 | 1.70 |
| | | c | | 3.08 | 1.54 |

The action of the salts of various complex forming aromatic sulphonic acids is demonstrated by the examples summarized in Table 3.

The following sulphonic acid potassium salts were used:
A: 2-phenol sulphonic acid K salt
B: phenol-3-sulphonic acid K salt
C: 1-naphthol-8-sulphonic acid K salt
D: 1-naphthol-4-sulphonic acid K salt
E: hydroquinone sulphonic acid K salt
F: hydroquinone-2,5-disulphonic acid K salt
G: 2,7-dihydroxynaphthalene-3,6-disulphonic acid K salt.

These salts may be added to the monomer mixture before the reaction or incorporated subsequently in the prepared polymer by compounding.

Examples 8 to 19, 20 to 24 and 25 to 34 demonstrate the influence of the structure of different sulphonic acids and sulphonic acid salts.

It is clear from Examples 26 and 28 that the stabilizing action is lost when there is any disturbance to the complex forming or chelate forming structure (phenol-3-sulphonic acid or 1-naphthol-4-sulphonic acid). The notched impact strength is only 15% or 17%, respectively, after 100 hours, in contrast to 70 to 88% in chelate forming structures. The stabilizing effect of sulphonic acid salts in the presence of different transesterification catalysts is also shown clearly by the Examples in Table 3.

The effect of the concentration of stabilizer is demonstrated by Examples 36 to 38.

The resistance to hydrolysis of LC polymers is distinctly improved compared to that of non-stabilized polymers.

droquinone sulphonic acid, hydroquinone disulphonic acid, 1,8-dihydroxynaphthalene-3,6-disulphonic acid, 2,7-dihydroxynaphthalene-3,6-disulphonic acid, 2-sulphobenzoic acid, 5-sulphosalicylic acid, 4-hydroxy-3-sulphobenzoic acid and/or 1-hydroxy-4,7-disulpho-2-naphthalene carboxylic acid.

TABLE 3

Notched impact strength in dependence upon the hydrolysis time

| Experiment Number | Catalyst* | Complex former | Conc. (ppm) of complex former | Notched impact strength ($a_k$) in dependence upon the hydrolysis time in water at 100° C. $a_k$ (kJ/m$^2$) | | | | Residual notched impact strength after 100 hours (%) |
|---|---|---|---|---|---|---|---|---|
| | | | | 0 | 10 | 50 | 100 (h) | |
| 25 | dibutyl tin laurate | A | 50 | 58 | 53 | 47 | 40 | 69 |
| 26 | " | B (comparison) | 50 | 55 | 43 | 27 | 8 | 15 |
| 27 | " | C | 50 | 57 | 50 | 49 | 42 | 73 |
| 28 | " | D (comparison) | 50 | 59 | 40 | 32 | 10 | 17 |
| 29 | " | E | 50 | 60 | 58 | 55 | 53 | 88 |
| 30 | " | F | 50 | 54 | 55 | 52 | 47 | 87 |
| 31 | " | G | 50 | 55 | 52 | 47 | 40 | 73 |
| 32 | Imidazole | E | 50 | 57 | 55 | 53 | 49 | 86 |
| 33 | " | G | 50 | 53 | 53 | 47 | 40 | 75 |
| 34 | p-hydroxybenzoic acid K salt | E | 50 | 50 | 49 | 44 | 39 | 78 |
| 35 | p-hydroxybenzoic acid K salt | E | 50 | 56 | 55 | 50 | 44 | 80 |
| 36 | dibutyl tin laurate | E | 5 | 60 | 50 | 43 | 31 | 52 |
| 37 | " | E | 100 | 58 | 54 | 52 | 49 | 84 |
| 38 | " | E | 200 | 54 | 55 | 50 | 44 | 82 |

*Concentration as in Table 1

We claim:

1. Thermotropic, fully aromatic polycondensates based on
   a) unsubstituted or substituted aromatic hydroxy carboxylic acids,
   b) diphenols,
   c) aromatic dicarboxylic acids and
   d) with or without carbonic acid, which contain 1 to 500 ppm of compounds capable of complex formation which comprise aromatic sulphonic acid compounds in the form of potassium, sodium or alkaline earth metal salts.

2. Thermotropic, fully aromatic polycondensates according to claim 1 which contain, as complex forming compounds, aromatic sulphonic acid salts having at least two functional groups capable of complex formation in the ortho or para position.

3. Thermotropic fully aromatic polycondensates according to claim 1 which contains salts of the following compounds as complex forming aromatic sulphonic acids: hydroxy aryl sulphonic acids, dihydroxy aryl sulphonic acids, hydroxy aryl disulphonic acids, dihydroxy aryl disulphonic acids and/or aromatic carboxylic sulphonic acids.

4. Thermotropic, fully aromatic polycondensates according to claim 1 which contains salts of phenol-2-sulphonic acid, 1-naphthol-2-sulphonic acid, 2-naphthol-1-sulphonic acid, 1-naphthol-8-sulphonic acid, hydroquinone sulphonic acid, hydroquinone disulphonic acid, 1,8-dihydroxynaphthalene-3,6-disulphonic acid, 2,7-dihydroxynaphthalene-3,6-disulphonic acid, 2-sulphobenzoic acid, 5-sulphosalicylic acid, 4-hydroxy-3-sulphobenzoic acid and/or 1-hydroxy-4,7-disulpho-2-naphthalene carboxylic acid.

5. Thermotropic, fully aromatic polycondensates according to claim 1 which contain the compounds capable of complex formation in quantities of from 1 to 200 ppm, based on the total quantity of components a) to d).

6. Process for the preparation of thermotropic, fully aromatic polycondensates according to claim 1, characterised in that the compounds capable of complex formation are incorporated in the thermotropic, fully aromatic polycondensates, which have been prepared by conventional methods, by subsequently compounding the components.

7. Process for the preparation of thermotropic, fully aromatic polycondensates which comprises a) esterifying unsubstituted or substituted p-hydroxy-benzoic acids and aromatic dicarboxylic acids with diaryl carbonate, b) transesterifying the resulting aryl esters from a) with diphenols and optionally further diaryl carbonate, with or without the presence of chain terminating agents, and c) polycondensing the ester from b) at temperatures of from 150° to 350° C. in the presence of catalysts, optionally at reduced pressure, wherein the transesterification or the polycondensation reaction is carried out in the presence of compounds capable of complex formation.

* * * * *